T. DAGEL.
THRESHING CYLINDER TOOTH.
APPLICATION FILED APR. 13, 1909.
927,331.
Patented July 6, 1909.
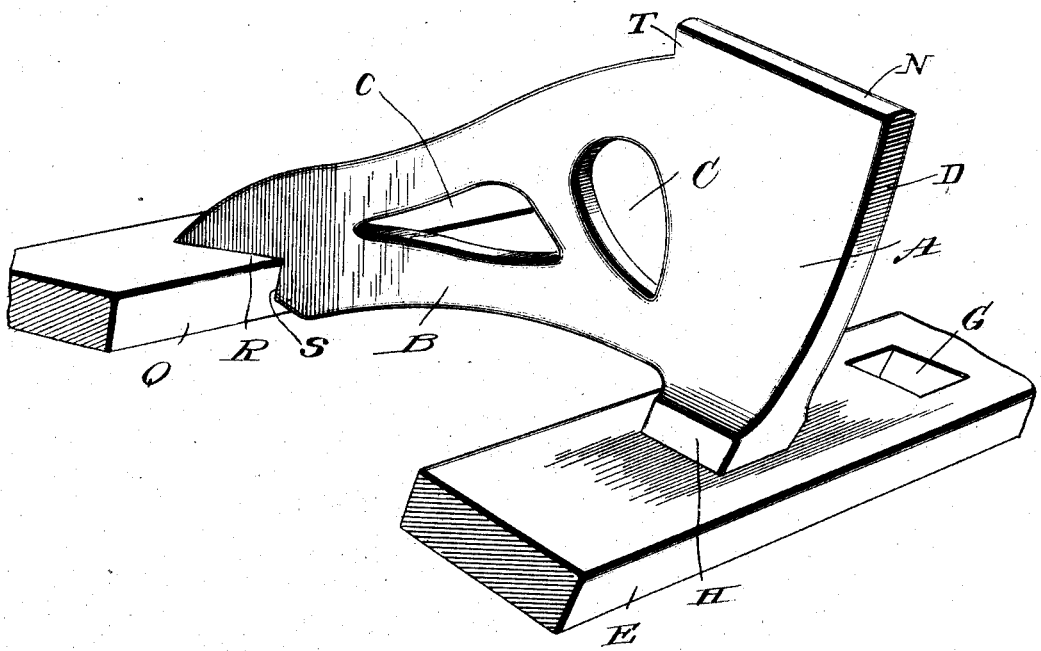
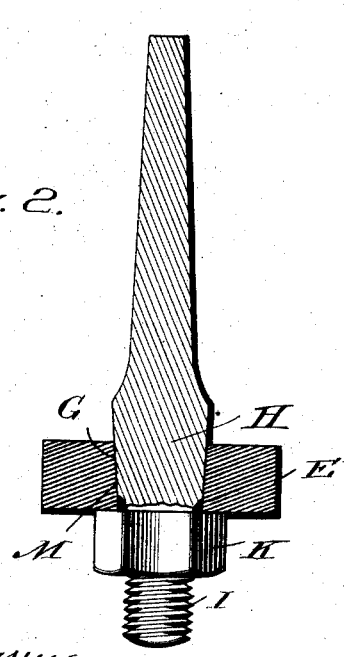
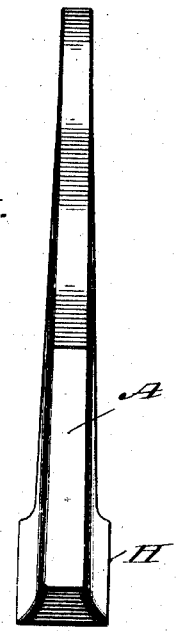
WITNESSES
INVENTOR
THOMAS DAGEL
BY
ATTORNEYS

UNITED STATES PATENT OFFICE.

THOMAS DAGEL, OF SIBLEY, IOWA.

THRESHING-CYLINDER TOOTH.

No. 927,331.  Specification of Letters Patent.  Patented July 6, 1909.

Application filed April 13, 1909. Serial No. 489,660.

*To all whom it may concern:*

Be it known that I, THOMAS DAGEL, a citizen of the United States, residing at Sibley, in the county of Osceola and State of Iowa, have made certain new and useful Improvements in Threshing-Cylinder Teeth, of which the following is a specification.

My invention is an improvement in threshing cylinder teeth, and consists in certain novel constructions and combinations of parts hereinafter described and claimed.

The object of the invention is to produce a tooth of the kind specified, which may be easily replaced and removed, and which is firmly braced against the cylinder in the direction of greatest strain.

Referring to the drawings forming a part hereof: Figure 1 is a perspective view of a portion of a cylinder provided with the teeth. Fig. 2 is a vertical transverse section of a tooth, and Fig. 3 is a plan view of the same.

The present embodiment of the invention comprises a tooth consisting of a body portion A, and a brace portion B, and the brace portion is provided with transverse openings C, for the sake of lightness. The body portion is provided with a flat front face D, which is somewhat arched from top to bottom as indicated in Fig. 1, but is substantially perpendicular to the bar E of the cylinder. The bars of the cylinder are provided at spaced intervals with square openings G, for receiving a substantially square shank H on the body portion of the tooth. The shank is wedge shaped, as shown in Fig. 2, and is provided with a threaded stem I, which extends beyond the bar and is engaged by nut K.

It will be evident from the description, that when the nut is turned the wedge shaped shank is drawn tightly into the opening G which is also wedge shaped and tapering as shown at M in Fig. 2 to fit the shank. The tooth is provided with a straight and substantially plane upper face N, and the sides of the tooth converge, at the free upper end or face N, and the brace portion extends rearwardly as shown in Fig. 1. The brace portion extends far enough to engage the succeeding cylinder bar Q and is provided with an angular recess R fitting the front edge and upper face of the said bar. The upper edge of the brace is inclined gradually toward the bar, and the face S of the recess bears tightly against the front edge of the bar. At the junction of the upper edge of the brace portion with the free edge of the tooth a rearwardly facing shoulder T is formed, defining the tooth proper from the brace portion.

It will be evident from the description, that the tooth is not complicated in structure, is easily removed and replaced, and is firmly braced in the direction of greatest strain, against another bar of the cylinder.

I claim—

1. The combination with the bars of a threshing cylinder, which bars are provided with tapering openings, of teeth, each consisting of a body portion having a tapering shank engaging an opening in one bar, the shank having a threaded stem projecting through the bar, and a nut engaging the stem, said tooth being provided with a rearwardly projecting brace, having an angular recess for engaging the front edge of the succeeding bar.

2. The combination with the bars of a threshing cylinder, which bars are provided with tapering openings, of teeth, each consisting of a body portion having a tapering shank engaging an opening in one bar, the shank having a threaded stem projecting through the bar, and a nut engaging the stem, said tooth being provided with a rearwardly and downwardly extending brace, engaging the succeeding bar.

3. The combination with the bars of a threshing cylinder, which bars are provided with tapering openings, of teeth, each consisting of a body portion having a tapering shank engaging an opening in one bar, and means for forcing the shank in the opening and securing the tooth in place, said tooth having a rearwardly and downwardly extending brace engaging the succeeding bar.

4. The combination with the bars of a threshing cylinder, of teeth, each consisting of a body portion having a shank for engaging one bar, and a rearwardly and downwardly extending brace provided with a recess for receiving the succeeding bar.

THOMAS DAGEL.

Witnesses:
L. B. GEDDES,
E. C. UPP.